(12) United States Patent
Higashiura et al.

(10) Patent No.: US 6,329,055 B1
(45) Date of Patent: Dec. 11, 2001

(54) MULTILAYER INSULATED WIRE AND TRANSFORMERS MADE BY USING THE SAME

(75) Inventors: Atsushi Higashiura; Isamu Kobayashi; Naoyuki Chida, all of Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/319,574

(22) PCT Filed: Oct. 12, 1998

(86) PCT No.: PCT/JP98/04580

§ 371 Date: Jun. 23, 1999

§ 102(e) Date: Jun. 23, 1999

(87) PCT Pub. No.: WO99/19885

PCT Pub. Date: Apr. 22, 1999

(30) Foreign Application Priority Data

Oct. 14, 1997 (JP) .................................... 9-280595

(51) Int. Cl.[7] ............... B32B 27/00; H01B 7/00
(52) U.S. Cl. ............ 428/383; 428/372; 428/379; 174/110 A; 174/110 SR; 174/120 R; 174/120 SR
(58) Field of Search .................. 428/379, 372, 428/383, 375; 174/120 R, 120 SR, 110 N, 110 PM, 110 SR, 110 A; 525/422, 423, 433, 425, 432, 437

(56) References Cited

U.S. PATENT DOCUMENTS

| | | | |
|---|---|---|---|
| 4,141,927 | * 2/1979 | White et al. | 260/857 |
| 4,258,155 | * 3/1981 | Holub et al. | 525/431 |
| 4,387,193 | * 6/1983 | Giles, Jr. | 525/431 |
| 4,493,873 | * 1/1985 | Keane et al. | 428/372 |
| 4,503,124 | * 3/1985 | Keane et al. | 428/372 |
| 4,537,804 | * 8/1985 | Keane et al. | 427/118 |
| 4,546,041 | * 10/1985 | Keane et al. | 428/372 |
| 4,548,997 | * 10/1985 | Mellinger et al. | 525/433 |

(List continued on next page.)

FOREIGN PATENT DOCUMENTS

| | | |
|---|---|---|
| 49-76278 | * 10/1947 | (JP) . |
| 57-2361 | 1/1982 | (JP) . |
| 57-2361A | 1/1982 | (JP) . |
| 3-56112 | 5/1992 | (JP) . |
| 06-57145A | 3/1994 | (JP) . |
| 6-57145 | 3/1994 | (JP) . |
| 10-60276 | 3/1998 | (JP) . |
| 10-60276A | 3/1998 | (JP) . |
| 10-125140 | 5/1998 | (JP) . |
| 10-125140A | 5/1998 | (JP) . |

Primary Examiner—Cynthia H. Kelly
Assistant Examiner—J. M. Gray
(74) Attorney, Agent, or Firm—Birch, Stewart, Kolasch & Birch, LLP

(57) ABSTRACT

There is disclosed a multilayer insulated wire which comprises a conductor and solderable extrusion-insulating layers made up of two or more layers for covering the conductor, wherein at least one insulating layer is formed by a mixture comprising 100 parts by weight of a resin (A), of at least one selected from the group consisting of polyetherimide resins and polyethersulfone resins, 10 parts by weight or more of a resin (B), of at least one selected from the group consisting of polycarbonate resins, polyarylate resins, polyester resins, and polyamide resin, and 15 to 200 parts by weight of an inorganic filler (C). There is also disclosed a transformer which utilizes the multilayer insulted wire. The multilayer insulated wire is excellent in heat resistance, solderability, high-frequency characteristic, and coilability, and it is favorably suitable for industrial production. Further, the transformer utilizing the multilayer insulated wire is excellent in electrical properties and high in reliability, since when used at high frequencies, electric properties are not lowered and influence by the generation of heat can be prevented.

11 Claims, 2 Drawing Sheets

U.S. PATENT DOCUMENTS

| | | | | |
|---|---|---|---|---|
| 4,629,759 | * | 12/1986 | Rock | 525/66 |
| 4,657,987 | * | 4/1987 | Rock et al. | 525/432 |
| 4,673,708 | * | 6/1987 | Rock et al. | 525/66 |
| 4,687,819 | * | 8/1987 | Quinn et al. | 525/425 |
| 4,716,079 | * | 12/1987 | Sano et al. | 428/383 |
| 4,908,418 | * | 3/1990 | Holub | 525/425 |
| 4,908,419 | * | 3/1990 | Holub | 525/425 |
| 5,013,799 | * | 5/1991 | Giles, Jr. et al. | 525/432 |
| 5,093,435 | * | 3/1992 | Harris et al. | 525/420 |
| 5,606,152 | | 2/1997 | Higashiura et al. . | |
| 5,861,578 | * | 1/1999 | Hake et al. | 174/120 R |
| 5,917,155 | * | 6/1999 | Hake et al. | 174/120 R |
| 6,056,995 | * | 5/2000 | Hake et al. | 427/118 |

* cited by examiner

MULTILAYER INSULATED WIRE AND TRANSFORMERS MADE BY USING THE SAME

This application is the national phase under 35 U.S.C. § 371 of PCT International Application No. PCT/JP98/04580 which has an International filing date of Oct. 12, 1998, which designated the United States of America.

TECHNICAL FIELD

The present invention relates to a multilayer insulated wire whose insulating layers are composed of two or more extrusion-coating layers. The present invention also relates to a transformer in which the said multilayer insulated wire is utilized. More specifically, the present invention relates to a multilayer insulated wire that is useful as a winding and a lead wire of a transformer incorporated, for example, in electrical/electronic equipment; the said wire is excellent in heat resistance and high-frequency characteristic, and it has such excellent solderability that, when the said wire is dipped in a solder bath, the insulating layer can be removed in a short period of time, to allow the solder to adhere easily to the conductor. The present invention also relates to a transformer that utilizes said multilayer insulated wire.

BACKGROUND ART

The construction of a transformer is prescribed by IEC (International Electrotechnical Communication) Standards Pub. 950, etc. That is, these standards provide that at least three insulating layers be formed between primary and secondary windings in a winding, in which an enamel film which covers a conductor of a winding be not authorized as an insulating layer, or that the thickness of an insulating layer be 0.4 mm or more. The standards also provide that the creeping distance between the primary and secondary windings, which varies depending on the applied voltage, be 5 mm or more, that the transformer withstand a voltage of 3,000 V applied between the primary and secondary sides for a minute or more, and the like.

According to such the standards, as a currently prevailing transformer has a structure such as the one illustrated in a cross-section of FIG. 2. In the structure, an enameled primary winding 4 is wound around a bobbin 2 on a ferrite core 1 in a manner such that insulating barriers 3 for securing the creeping distance are arranged individually on the opposite sides of the peripheral surface of the bobbin. An insulating tape 5 is wound for at least three turns on the primary winding 4, additional insulating barriers 3 for securing the creeping distance are arranged on the insulating tape, and an enameled secondary winding 6 is then wound around the insulating tape.

Recently, a transformer having a construction which includes neither the insulating barriers 3 nor the insulating tape layer 5, as shown in FIG. 1, has started to be used in place of the transformer having the construction shown in the cross-section of FIG. 2. The transformer shown in FIG. 1 has an advantage over the one having the construction shown in FIG. 2 in being able to be reduced in overall size and dispense with the winding operation for the insulating tape.

In manufacturing the transformer shown in FIG. 1, it is necessary, in consideration of the aforesaid IEC standards, that at least three insulating layers 4b (6b), 4c (6c), and 4d (6d) are formed on the outer peripheral surface on one or both of conductors 4a (6a) of the primary winding 4 and the secondary winding 6 used.

As such a winding, a winding in which an insulating tape is first wound around a conductor to form a first insulating layer thereon, and is further wound to form second and third insulating layers in succession, so as to form three insulating layers that are separable from one another, is known. Further, a winding in which a conductor enameled with polyurethane is successively extrusion-coated with a fluororesin, whereby extrusion-coating layers composed of three layers structure in all are formed for use as insulating layers, is known (JU-A-3-56112 ("JU-A" means unexamined published Japanese Utility Model application)).

In the above-mentioned case of winding an insulating tape, however, because winding the tape is an unavoidable operation, the efficiency of production is extremely low, and thus the cost of the electrical wire is conspicuously increased.

In the above-mentioned case of extrusion of a fluororesin, since the insulating layer is made of the fluororesin, there is the advantage of good heat resistance and high-frequency characteristic. On the other hand, because of the high cost of the resin and the property that when it is pulled at a high shearing speed, the external appearance is deteriorated, it is difficult to increase the production speed, and like the insulating tape, the cost of the electric wire becomes high. Further, in this case of the insulating layer, there is a problem that, since the insulating layer cannot be removed by dipping in a solder bath, the insulating layer on the terminal has to be removed using less reliable mechanical means, and further the wire must be soldered or solderless-connected, when the terminal is worked for the insulated wire to be connected, for example, to a terminal.

On the other hand, a multilayer insulated wire is put to practical use, wherein multilayer extrusion-insulating layers are formed from a mixture of a polyethylene terephthalate as a base resin with an ionomer prepared by converting part of carboxyl groups of an ethylene/methacrylic acid copolymer to metal salts, and wherein the uppermost covering layer among the insulating layers is made of a polyamide (nylon). This multilayer insulated wire is excellent in cost of electrical wire (nonexpensive materials and high producibility), solderability (to make possible direct connection between an insulated wire and a terminal), and coilability (that means that, in winding the insulated wire around a bobbin, the insulating layer is not broken to damage the electrical properties of the coil, when, for example, parts of the insulated wire are rubbed with each other or the insulated wire is rubbed with a guide nozzle)(U.S. Pat. No. 5,606,152, and JP-A-6-223634 ("JP-A" means unexamined published Japanese patent application)).

Further, to improve heat resistance, the inventors proposed an insulated wire whose base resin is changed from the above polyethylene terephthalate to polycyclohexanedimethylene terephthalate (PCT).

However, although the heat resistance of these multilayer insulated wires is acceptable to heat-resistance Class E in the test method in conformity to Annex U (Insulated wires) of Item 2.9.4.4 and Annex C (Transformers) of Item 1.5.3 of the IEC 950-standards, it is not acceptable to heat-resistance Class B of the IEC standards. It cannot be said that such multilayer extrusion-coating insulated wire satisfactorily meets the demand for improvement in the performance of transformers in the future, which will become more and more strict.

First, as electrical/electronic equipments have been made small-sized in recent years, the influence of heat generation on a transformer becomes remarkable easily, and therefore, even in the case of the above three-layer extrusion coating insulated wire, higher heat resistance is demanded. Further, the frequency used in circuits of transformers is made into high frequencies, and therefore improvements in electrical properties at high frequencies are demanded.

To solve such problems, an object of the present invention is to provide a multilayer insulated wire that is excellent in heat resistance, solderability, high-frequency characteristic, and coilability, and that is favorably suitable for industrial production.

Further, another object of the present invention is to provide a transformer excellent in electrical properties and high in reliability, wherein, when it is used at high frequencies, the electric properties are not lowered, and influence by the generation of heat is prevented, and wherein such an insulated wire excellent in heat resistance, solderability, high-frequency characteristic, and coilability is wound.

Other and further objects, features, and advantages of the invention will appear more fully from the following description, taken in connection with the accompanying drawings. DISCLOSURE OF INVENTION The above objects of the present invention have been attained by the following multilayer insulated wire and the following transformer in which the said wire is used.

That is, according to the present invention there is provided:

(1) A multilayer insulated wire comprising a conductor and solderable extrusion-insulating layers made up of two or more layers for covering the conductor, wherein at least one insulating layer is formed by a mixture comprising 100 parts by weight of a resin (A), of at least one selected from the group consisting of polyetherimide resins and polyethersulfone resins, 10 parts by weight or more of a resin (B)p, of at least one selected from the group consisting of polycarbonate resins, polyarylate resins, polyester resins, and polyamide resin, and 15 to 200 parts by weight of an inorganic filler (C), (2) The multilayer insulated wire as stated in the above (1), wherein the mixture, which comprises the resins (A) and (B), and the inorganic filler (C), comprises 100 parts by weight of the resin (A), 10 to 70 parts by weight of the resin (B), and 20 to 140 parts by weight of the inorganic filler (C), (3) The multilayer insulated wire as stated in the above (1) or (2), wherein insulating layers other than the insulating layer made of the mixture that comprises the resins (A) and (B) and the inorganic filler (C), are made of a resin mixture that comprises 100 parts by weight of the resin (A) and 10 parts by weight or more of the resin (B)

(4) The multilayer insulated wire as stated in the above (1) or (2), wherein insulating layers other than the insulating layer made of the mixture that comprises the resins (A) and (B) and the inorganic filler (C), are made of a resin mixture that comprises 100 parts by weight of the resin (A) and 20 to 70 parts by weight of the resin (B), (5) The multilayer insulated wire as stated in the above (1), (2), (3), or (4), wherein the insulating layer made of the mixture that comprises the resins (A) and (B) and the inorganic filler (C) is formed at least as the outermost layer, (6) The multilayer insulated wire as stated in one of the above (1) to (5), wherein the resin (A) is a polyethersulfone resin, (7) The multilayer insulated wire as stated in one of the above (1) to (5), wherein the resin (B) is a polycarbonate resin and/or a polyarylate resin, (8) The multilayer insulated wire as stated in one of the above (1) to (5), wherein the resin (A) is a polyethersulfone resin, and the resin (B) is a polycarbonate resin and/or a polyarylate resin, (9) The multilayer insulated wire as stated in one of the above (1), (2), (3), (4), (5), (6), (7), or (8), wherein the resin (A) is a polyethersulfone resin having a repeating unit represented by the following formula:

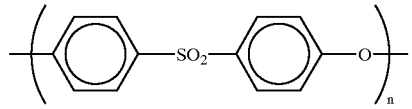

wherein n is a positive integer,

(10) The multilayer insulated wire as stated in one of the above (1) to (9), wherein the inorganic filler (C) comprises at least one selected from among titanium oxide and silica,

(11) The multilayer insulated wire as stated in one of the above (1) to (10), wherein the inorganic filler (C) has an average particle diameter of 5 μm or less,

(12) A multilayer insulated wire, comprising the multilayer insulated wire stated in one of the above (1) to (11) whose surface is coated with a paraffin and/or a wax; and

(13) A transformer, wherein the multilayer insulated wire stated in one of the above (1) to (12) is utilized.

Herein, the outermost layer in the present invention refers to the layer situated farthest from the conductor out of the extrusion-coating insulating layers.

BEST MODE FOR CARRYING OUT THE INVENTION

Figure 1:
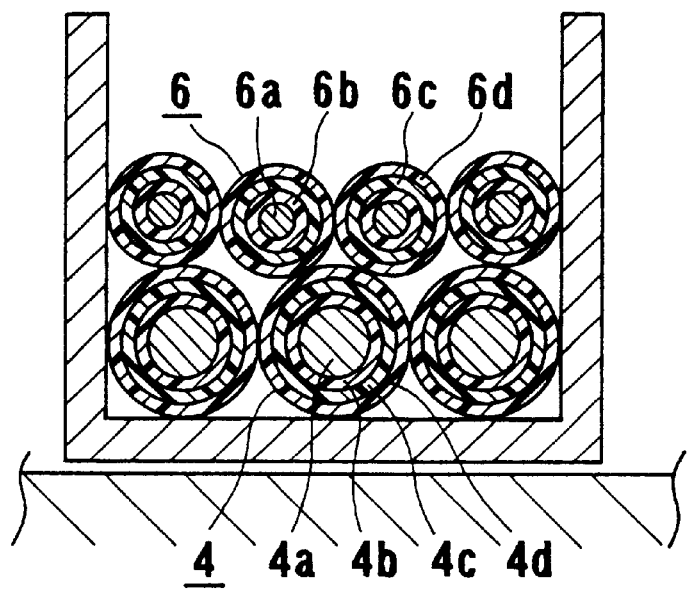
FIG. 1 is a cross-sectional view illustrating an example of the transformer having a structure in which three-layer insulated wires are used as windings.
Figure 2:
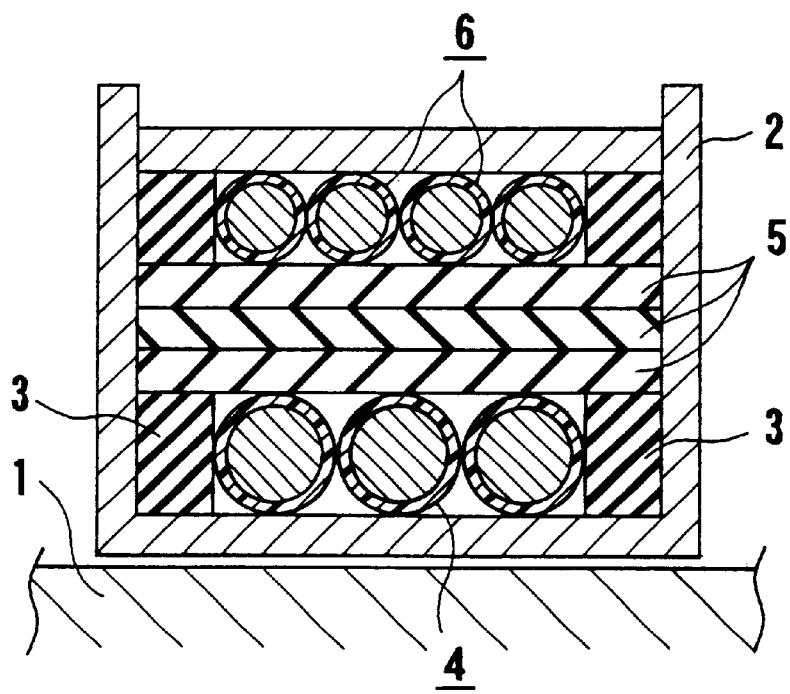
FIG. 2 is a cross-sectional view illustrating an example of the transformer having a conventional structure.

The said resin (A) used in the present invention is a resin high in heat resistance, and as this resin, polyethersulfone resins can be selected from known polyethersulfone resins for use.

The polyethersulfone resins to be used are preferably those represented by the following formula (1):

formula (1)

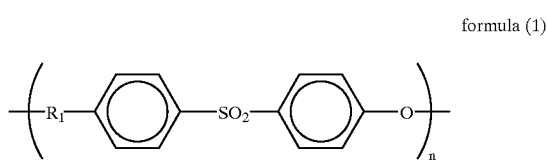

wherein $R_1$ represents a single bond or $-R_2-O-$, in which $R_2$, which may have a substituent (e.g. an alkyl group), represents a phenylene group, a biphenylylene group, and n is a positive integer large enough to give the polymer.

The method of producing the resin is known per se, and as an example, a manufacturing method in which a dichlorodiphenyl sulfone, bisphenol S, and potassium carbonate are reacted in a high-boiling solvent, can be mentioned. As commercially available resins, for example, VICTREX PES SUMIKAEXCEL PES (trade names, manufactured by Sumitomo Chemical Co., Ltd.) and RADEL A RADEL R (trade names manufactured by Amoco) can be mentioned.

Further, the larger the molecular weight of the resin is, the more preferable it is and the more improved the flexibility in the function of the electric wire is. However, if the molecular weight of the resin is too large, it is difficult to extrude the resin into a thin film. In the present invention, the polyethersulfone resin has a reduced viscosity that is directly proportional to the molecular weight (a viscosity of a dimethylformamide solution of a polyethersulfone resin (1 g of a polyethersulfone resin (PES) in 100 ml of dimethylformamide) in a thermostat at 25° C., to be measured using a Ubbelohde's viscometer), of preferably 0.31 or more, and particularly preferably in the range of 0.41 to 0.48. More specifically, when any inorganic filler is not used in combination with, the polyethersulfone resin preferably has a reduced viscosity of 0.31 or more, and more preferably 0.36 to 0.48. On the other hand, when the inorganic filler is used in combination with, the polyethersulfone resin preferably has a reduced viscosity of 0.36 or more, and more preferably 0.41 to 0.48.

Particularly, when the amount of an inorganic filler to be used is large, it is preferable to use a polyethersulfone resin whose reduced viscosity is large, in view of flexibility of the resultant insulted wire.

Further, as the resin (A), polyetherimide resins can be used. The polyetherimide resins, as well as the methods of producing the polyetherimide resins, are known, and, for example, the polyetherimide resins can be synthesized by solution polycondensation of 2,2'-bis[3-(3,4-dicarboxyphenoxy)-phenyl]propanediacid anhydride and 4,4'-diaminodiphenylmethane in ortho-dichlorobenzene as a solvent.

The polyetherimide resins are preferably those represented by formula (2):

formula (2)

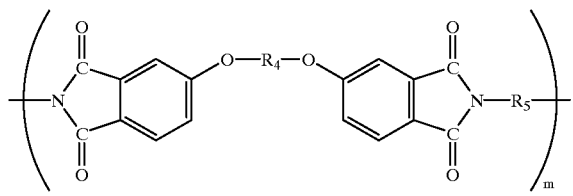

wherein $R_4$ and $R_5$ each represent a phenylene group, a biphenylylene group,

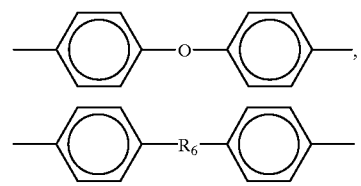

in which $R_6$ represent an alkylene group preferably having 1 to 7 carbon atoms (such as preferably methylene, ethylene, and propylene (particularly preferably isopropylidene)), or a naphthylene group, each of which $R_4$ and $R_5$ may have a substituent, such as an alkyl group (e.g. methyl and ethyl); and m is a positive integer large enough to give the polymer.

As commercially available resins, for example, ULTEM (trade name, manufactured by GE Plastics Ltd.) can be mentioned.

In the present invention, by mixing the heat-resistant resin (A) with the resin (B), the resin composition is given solderability.

The above-mentioned polycarbonate resins, polyarylate resins, polyester resins, and polyamide resins used as the resin (B) are not particularly restricted. As the polycarbonate resins, use can be made of those produced by a known method using, for example, dihydric alcohols, phosgene, etc., as raw materials. As commercially available resins, LEXAN (trade name, manufactured by GE Plastics Ltd.), PANLITE (trade name, manufactured by Teijin Chemicals Ltd.) and UPIRON (trade name, manufactured by Mitsubishi Gas Chemical Co., Inc.) can be mentioned. As the polycarbonate resins for use in the present invention, known polycarbonate resins can be used, such as those represented by formula (3):

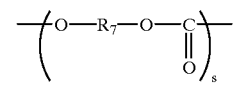

wherein $R_7$ represents a phenylene group, a biphenylylene group,

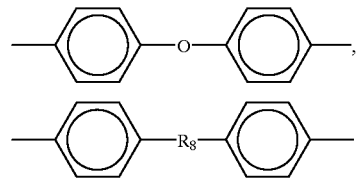

in which $R_8$ represents an alkylene group preferably having 1 to 7 carbon atoms (such as preferably methylene, ethylene, or propylene (particularly preferably isopropylidene)), or a naphthylene group, each of which may have a substituent, such as an alkyl group (e.g. methyl and ethyl); and s is a positive integer large enough to give the polymer.

Further, the polyarylate resins are generally produced by the interfacial polymerization method, in which, for example, bisphenol A dissolved in an aqueous alkali solution, and a terephthalic chloride/isophthalic chloride mixture dissolved in an organic solvent, such as a halogenated hydrocarbon, are reacted at normal (room) temperatures, to synthesize the resin. As commercially available resins, for example, U-POLYMER (trade name, manufactured by Unitika Ltd.) can be mentioned.

Further, as the polyester resins, those produced by a known method using, as raw materials, dihydric alcohols, divalent aromatic carboxylic acids, etc., can be used. As commercially available resins, use can be made of polyethylene terephthalate (PET)-series resins, such as BYROPET (trade name, manufactured by Toyobo Co., Ltd.), BELLPET (trade name, manufactured by Kanebo, Ltd.), and TEIJIN PET (trade name, manufactured by Teijin Ltd.); polyethylene naphthalate (PEN)-series resins, such as TEIJIN PEN (trade name, manufactured by Teijin Ltd.); and polycyclohexanedimethylene terephthalate (PCT)-series resins, such as EKTAR (trade name, manufactured by Toray Industries, Inc.).

Further, as the polyamide resins, those produced by a known method using, as raw materials, diamines, dicarboxylic acids, etc., can be used. As commercially available resins, for example, nylon 6,6, such as AMILAN (trade name, manufactured by Toray Industries, Inc.), ZYTEL (trade name, manufactured by E.I. du Pont De Nemours & Co., Inc.), MARANYL (trade name, manufactured by Unitika Ltd.); nylon 4,6, such as Unitika NYLON 46 (trade name, manufactured by Unitika Ltd.); and nylon 6, T, such as ARLEN (trade name, manufactured by Mitsui Petrochemical Industries, Ltd.), can be mentioned.

Further, in the present invention, as to the resin (B), for example, polycarbonate resins, polyarylate resins, polyester resins, and polyamide resins, which is to be mixed with the resin (A) that has heat resistance, part of this resin (B) is expected to be decomposed to produce components exhibiting flux action (e.g. carboxylic acids, amines, alcohols, and aldehydes) when the resin is mixed (kneaded) with the heat resistant resin (A), or when the insulated wire is soldered.

In the present invention, the amount of the resin (B) to be mixed to 100 parts by weight of the resin (A) is 10 parts by weight or more. When the amount of the resin (B) is less than 10 parts by weight to 100 parts by weight of the resin (A), heat resistance is increased but solderability cannot be obtained. The upper limit of the amount of the resin (B) to be mixed is determined taking the level of the required heat resistance into account, and it is preferably 100 parts by weight or less. When a particularly high level of heat resistance is to be realized while keeping high solderability, the amount of the resin (B) to be mixed is preferably 70 parts by weight or less, and a preferable range wherein both of these properties are particularly well balanced is that the amount of the resin (B) to be mixed is 20 to 50 parts by weight, to 100 parts by weight of the resin (A).

In the present invention, it is particularly noticeable that polyetherimnide resins and polyethersulfone resins that are heat-resistance resins do not show any solderability at all, and the solderability of polycarbonate resins and polyarylate resins is not on a practical level, and, only when both the resins ((A) and (B)) are blended, can the solderability be improved to a practical level. Although polyester resins and polyamide resins exhibit good solderability, when respectively used singly, it is surprising that practical solderability can be exhibited even upon mixing them at a low rate.

On the other hand, to improve further the high-frequency characteristic and the solvent resistance of the mixture of the resin (A) and the resin (B), in the present invention, the inorganic filler (C) is further comprised in the mixture of the resin (A) and the resin (B).

As the inorganic filler that can be used in the present invention, can be mentioned titanium oxide, silica, alumina, zirconium oxide, barium sulfate, calcium carbonate, clay, talc, and the like. Among the above, titanium oxide and silica are particularly preferable, because they are good in dispersibility in a resin, particles of them hardly aggregate, and they hardly cause voids in an insulating layer, as a result, the external appearance of the resulting insulating wire is good and abnormality of electrical properties hardly occurs. Preferably the inorganic filler has an average particle diameter of 5 $\mu$m or less, and more preferably 3 $\mu$m or less. The lower limit of the average particle diameter of the inorganic filler is not particularly restricted, and preferably it is 0.01 $\mu$m or more, and more preferably 0.1 $\mu$m or more. If the particle diameter is too large, the external appearance of the electric wire is sometimes deteriorated because of such problems as the inclusion of voids and a decrease in the smoothness of the surface. On the other hand, if the average particle diameter of the inorganic filler is too small, the bulk specific gravity becomes small and mixing (kneading) is not carried out well in some cases. Further, an inorganic filler high in water absorption property lowers the electric properties sometimes, and therefore an inorganic filler low in water absorption property is preferable. Herein, "low in water absorption property" means that the water absorption at room temperature (25° C.) and a relative humidity of 60% is 0.5% or less.

Furthermore, when the resin, the inorganic filler, and the mixture thereof are mixed (kneaded) and an electric wire is covered, it is preferable to dry the resin, the inorganic filler, and the mixture thereof to have a water absorption of 0.1% or less and preferably 0.05% or less, respectively, in view of retaining flexibility in the function of the resultant electric wire.

The commercially available inorganic filler that can be used in the present invention includes, for example, as titanium oxide, FR-88 (trade name; manufactured by FURUKAWA CO., LTD.;

average particle diameter: 0.19 $\mu$m), FR-41 (trade name; manufactured by FURUKAWA CO., LTD.; average particle diameter: 0.21 $\mu$m), and RLX-A (trade name; manufactured by FURUKAWA CO., LTD.; average particle diameter: 3 to 4 $\mu$m); as silica, UF-007 (trade name; manufactured by Tatsumori, LTD.; average particle diameter: 5 $\mu$m) and 5× (trade name; manufactured by Tatsumori, Ltd.; average particle diameter: 1.5 $\mu$m); as alumina, RA-30 (trade name; manufactured by Iwatani International Corporation; average particle diameter: 0.1 $\mu$m); and as calcium carbonate, VIGOT-15 (trade name; manufactured by SHIRAISHI KOGYO KAISHA, LTD.; average particle diameter: 0.15 $\mu$m) and SOFTON (trade name; manufactured by BIHOKU FUNKA KOGYO CO., LTD.; average particle diameter: 3 $\mu$m).

The proportion of the inorganic filler (C) in the above mixture is 15 to 200 parts by weight, to 100 parts by weight of the above resin (A). If the proportion is less than 15 parts by weight, the desired high heat-resistance and high-frequency characteristic cannot be obtained, further the heat shock resistance becomes bad, cracks reaching the conductor cannot be prevented from occurring, and in addition the solvent resistance is poor. On the other hand, if the proportion is over 200 parts by weight, the dispersion stability of the inorganic filler and the flexibility in the function of the electric wire are conspicuously lowered, while, as a result, the electric properties (breakdown voltage and withstand voltage) are deteriorated. The heat shock resistance in the present invention refers to the property against heat shock due to winding stress (simulating coiling). In view of the balance among the heat resistance, the high-frequency characteristic, the heat shock resistance, the solvent resistance, and other desired electric properties, preferably the proportion of the inorganic filler (C) is 20 to 140 parts by weight, and more preferably 25 to 100 parts by weight, to 100 parts by weight of the above resin (A).

The above mixture comprising the resins (A) and (B) and the inorganic filler (C), or the resin mixture of (A) and (B) to be used in another insulating layer, can be prepared by melting and mixing by using a usual mixer, such as a twin-screw extruder, a kneader, and a co-kneader. It has been found that the mixing temperature of the resins to be mixed has an influence on the direct solderability, and the higher the mixing temperature of the mixer is set at, the better the resulting direct solderability is. Particularly preferably the mixing temperature is set at 320° C. or higher.

To the above mixture or resin mixture can be added another heat-resistant thermoplastic resin, in such amounts that they do not impair the action and effects to be attained according to the present invention. The heat-resistant thermoplastic resins that can be added are preferably ones that themselves are good in solderability, such as a polyurethane resin and a polyacryl resin.

To the above mixture or resin mixture can be added additives, processing aids, and coloring agents, each of which are usually used, in such amounts that they do not impair the action and effects to be attained according to the present invention.

The insulating layers of the insulated wire of the present invention is made up of two or more layers, and preferably three layers. At least one layer out of the extruded insulating layers is an insulating layer made of the mixture containing the above resins (A) and (B) and the inorganic filler (C). The position of the insulating layer made of the above mixture is not particularly limited, and that layer may be the outermost layer or an layer other than the outermost layer. Preferably, the layer made of the above mixture is provided at least the outermost layer, in view of the solvent resistance. Further, when an insulated wire is applied with a voltage higher than a partial discharge inception voltage by any cause, surface breakage due to corona may begin from the vicinity of parts where electric wires contact to each other, which breakage occurs more intensively under high-voltage and high-frequency, making break of wire easily proceed, thereby causing the deterioration of the electric properties. Therefore, in order to prevent this phenomenon, it is preferable that the layer made of the above mixture of the resins (A) and (B) and the inorganic filler (C) is provided at least the outermost layer (and optionally another insulating layer) in the insulated wire of the present invention. In this case, in view of the further improvement, for example, in the heat resistance and the high frequency characteristic, all the layers can be made of the above mixture, but in some cases, the electric properties (breakdown voltage and withstand voltage) are lowered a little. Therefore, preferably one layer or several layers (particularly preferably one layer or two layers) out of all the layers are made of the above mixture, or the proportion of the inorganic filler is more increased in an outer layer than in an inner layer. In this case, if only the outermost layer is made of the above mixture, the heat resistance, the high-frequency V-t characteristic, the solvent resistance, and the heat shock resistance can be greatly improved, but one wherein the proportion of the inorganic filler is increased in the more outer layer is more preferable because the adhesion between the layers is improved.

As thermoplastic resins having solderability that can be used for forming an insulating layer other than the insulating layer made of the above resin mixture, besides the above resin mixture of the resins (A) and (B), resins whose major component is a polyamide, and resins whose major component is a polyester, can be used, and specific examples of polyamide resins that can be used include nylon 12, nylon 6, nylon 6,6, and nylon 4,6. Preferably, use can be made of the resin mixture that contains the resin (A) and the resin (B), and their mixing proportions are the same as those described for the mixture further containing the inorganic filler (C).

In particular, to make the heat resistance and solderability balance, preferably nylon 6,6 or nylon 4,6 is used, and they may be used to form the outermost layer of the insulating layers, when they are added an inorganic filler, in consideration of the coilability and high-frequency characteristic of the resulting insulated wire.

Further, as the polyester resins, those made from aromatic dicarboxylic acids and aliphatic diols, such as polybutylene terephthalates (PBT), polyethylene terephthalates (PET), polycyclohexanedimethane terephthalates (PCT), and polyethylene naphthalates (PEN), can be used.

Further, when the resin mixture of the resins (A) and (B) or the mixture further containing the inorganic filler (C) is applied to a conductor by extrusion coating, the solderability is improved greatly if the conductor is not preliminarily heated (preheated). When the conductor is preliminarily heated, preferably the temperature is set to 140 C. or below.

That is, the weakening of the adhesion between the conductor and the mixture coating layer due to not heating the conductor, together with a large heat shrinkage of 10 to 30% of the mixture coating layer in the direction of the wire length at the time of soldering, improves the solderability.

The multilayer insulated wire of the present invention may be provided with a covering layer having a specific function as an outermost layer of the electric wire, on the outside of the above two or more extrusion-coating insulating layers. For the insulated wire of the present invention, if necessary, a paraffin, a wax (e.g. a fatty acid and a wax), or the like can be used, as a surface-treating agent. The refrigerating machine oil used for enameled windings is poor in lubricity and is liable to make shavings in the coiling operation, but this problem can be solved by applying a paraffin or a wax in a usual manner.

As the conductor for use in the present invention, a metal bare wire (solid wire), an insulated wire having an enamel film or a thin insulating layer coated on a metal bare wire, a multicore stranded wire (a bunch of wires) composed of intertwined metal bare wires, or a multicore stranded wire composed of intertwined insulated-wires that each have an enamel film or a thin insulating layer coated, can be used. The number of the intertwined wires of the multicore stranded wire (a so-called litz wire) can be chosen arbitrarily depending on the desired high-frequency application. Alternatively, when the number of wires of a multicore wire is large, for example, in a 19- or 37-element wire, the multicore wire (elemental wire) may be in a form of a stranded wire or a non-stranded wire. In the non-stranded wire, for example, multiple conductors that each may be a bare wire or an insulated wire to form the elemental wire, may be merely gathered (collected) together to bundle up them in an approximately parallel direction, or the bundle of them may be intertwined in a very large pitch. In each case of these, the cross-section thereof is preferably a circle or an approximate circle. However, it is required that, as the material of the thin insulating layer, a resin that is itself good in solderability, such as an esterimide-modified polyurethane resin, a urea-modified polyurethane resin, and a polyesterimide resin, be used, and specifically, for example, WD-4305 (trade name, manufactured by Hitachi Chemical Co., Ltd.), TSF-200 and TPU-7000 (trade names, manufactured by Totoku Toryo Co.), and FS-304 (trade name, manufactured by Dainichi Seika Co.) can be used. Further, application of solder to the conductor or plating of the conductor with tin is a means of improving the solderability.

In a preferable embodiment of the present invention, the heat-resistant multilayer insulated wire is made up of three layers. Preferably, the overall thickness of the extrusion-coating insulating layers is controlled within the range of 60 to 180 μm. This is because the electrical properties of the resulting heat-resistant multilayer insulated wire are greatly lowered, to make the wire impractical, in some cases, if the overall thickness of the insulating layers is too small. On the other hand, the solderability is deteriorated considerably in some cases, if the overall thickness of the insulating layers is too large. More preferably the overall thickness of the extrusion-coating insulating layers is in the range of 70 to 150 μm. Preferably, the thickness of each of the above three layers is controlled within the range of 20 to 60 μm.

In the multilayer insulated wire of the present invention, the insulating layers have at least one layer made of the resin mixture containing the resins (A) and (B) and the inorganic filler (C), and the remaining insulating layer(s) may be a layer made of the resin mixture of the resins (A) and (B), or a layer whose major component is another thermoplastic resin that is solderable, so that heat resistance, solderability, and high-frequency characteristic can be satisfied.

In this connection, first, the reason for that both properties of heat resistance and solderability can be attained, is not clearly known but is expected as follows. That is, it is important that the resin mixture be made up of at least one resin selected from polyetherimide resins and polyethersulfone resins higher in heat resistance, and at least one resin selected from polycarbonate resins, polyarylate resins, polyester resins, and polyamide resins lower in heat resistance. When they are mixed, part of the resins lower in heat resistance is decomposed thermally, to be lowered in molecular weight, thereby lowering the melt viscosity of the resultant mixture and producing components that exhibit flux action. This is believed to make it possible to cause solderability to be exhibited while keeping high heat resistance in the case of extrusion coating. In addition, the inorganic filler in the mixture scarcely affects the action of solderability.

Further, when the said mixture containing the resins (A) and (B) is formed into the first coating layer (the innermost layer), it has been found that, due to the large heat shrinkage the adhesion is lowered without carrying out preliminary heating of the conductor, and therefore the level of solderability can be further improved.

Further, it is considered that the remarkable improvement in the high-frequency characteristic by the inorganic filler (C) is attributed to the resistance to breakdown due to corona from the electric wire surface, which resistance has been increased remarkably by the synergistic effect resulted from the use of the heat-resistant resins.

The transformer of the present invention, in which the multilayer insulated wire of the present invention is used, not only satisfies the IEC 950 standards, it is also applicable to severe design, since there is no winding of an insulating tape, such that the transformer can be made small in size and the heat resistance and the high-frequency characteristic may be high.

The multilayer insulated wire of the present invention can be used as a winding for any type of transformer, including those shown in FIG. 1. In such a transformer, generally a primary winding and a secondary winding are wound in a layered manner on a core, but the multilayer insulated wire of the present invention may be applied to a transformer in which a primary winding and a secondary winding are alternatively wound (JP-A-5-152139). Further, in the transformer of the present invention, the above multilayer insulated wire may be used for both the primary winding and the secondary winding, and if the insulated wire having three-layered extruded insulating layers is used for one of the primary and the secondary windings, the other may be an enameled wire. Additionally stated, in the case wherein the insulated wire having two-layered extruded insulating layers is used only for one of the windings and an enameled wire is used for the other, it is required that one layer of an insulating tape is interposed between the windings and an insulating barrier is required to secure a creeping distance.

The multilayer insulated wire of the present invention has such excellent actions and effects that it is heat-resistant high enough to satisfy the heat resistance B class, it has high solvent-resistant, cracks due to heat shock are not formed, and, further, electric properties at high frequencies are good. Further, the insulated wire of the present invention can be preferably and suitably used as a lead wire or a winding in a transformer, and when the terminal is worked, direct soldering can be carried out, since the insulated wire is excellent in solderability and coilability. The transformer of the present invention wherein the above multilayer insulated wire is utilized, can meet the requirements for electrical/electronic equipments that are increasingly made small-sized, because the transformer is excellent in electrical properties without being lowered in electric properties when a high frequency is used in a circuit, and the transformer is less influenced by generation of heat.

EXAMPLES

The present invention will now be described in more detail with reference to the following examples, but the invention is not limited to them.

Examples 1 to 10, and Comparative Examples 1 and 2, and Reference Examples 1 and 2

As conductors, bare wires (solid wires) of annealed copper wires of diameter 0.4 mm (Examples 1 to 8 and 10, Comparative examples 1 and 2, and Reference examples 1 and 2), and stranded wires, each composed of seven intertwined cores (insulated wires), each made by coating an annealed copper wire of diameter 0.15 mm with Insulating Varnish WD-4305, trade name, manufactured by Hitachi Chemical Co., Ltd., so that the coating thickness of the varnish layer would be 8 pim (Example 9), were provided. The conductors were respectively coated successively, by extrusion coating, with resin layers having the formulations (compositions are shown in terms of parts by weight) for extrusion coating and the thicknesses shown in Tables 1, 2, and 3, and the resultant coated conductors were respectively surface-treated, thereby preparing multilayer insulated wires.

With respect to the thus-prepared multilayer insulated wires, the properties were measured and evaluated according to the following test methods:

(1) Solvent Resistance

In accordance with the evaluation of JIS C $3003^{-1984}14.1$ (2), after the insulated wire was immersed in a solvent for 30 min, the presence or absence of swelling of the coating was evaluated, and the pencil hardness of the film was measured.

(2) Solderability

A length of about 40 mm at the end of the insulted wire was dipped in molten solder at a temperature of 450° C., and the time (sec) required for the adhesion of the solder to the dipped 30-mm-long part was measured. The shorter the required time is, the more excellent the solderability is. The numerical value shown was the average value of n=3.

(3) Dielectric Breakdown Voltage

The dielectric breakdown voltage was measured in accordance with the two-twisting method of JIS C $3003^{-1984}11.$ (2).

(4) Heat Resistance

The heat resistance was evaluated by the following test method, in conformity to Annex U (Insulated wires) of Item 2.9.4.4 and Annex C (Transformers) of Item 1.5.3 of 950-standards of the IEC standards.

Ten turns of the multilayer insulated wire were wound around a mandrel of diameter 6 mm under a load of 118 MPa (12 kg/mm$^2$). They were heated for 1 hour at 225 ° C. (Class E, 215° C.), and then for additional 72 hours at 175° C. (Class E, 165° C.), and then they were kept in an atmosphere of 25° C. and humidity 95% for 48 hours. Immediately thereafter, a voltage of 3,000 V was applied thereto, for 1 min. When there was no electrical short-circuit, it was considered that it passed Class B. (The judgment was made with n=5. It was considered that it did not pass the test if it was NG even when n=1.)

(5) Heat Shock Resistance

The heat shock resistance was evaluated in accordance with IEC 851-6 TEST 9. After winding to the identical diameter (1D) was done, it was placed in a thermostat at 225° C. for 30 min, and then cracks in the coating was observed whether they would formed. When there was no cracks in the coating, it was judged good.

(6) High-Frequency V-t Characteristic

A test specimen was made in accordance with the two-twisting method of JIS C 3003$^{-1984}$11. (2), and the life (min) until the occurrence of short-circuit at an applied voltage of 3.8 kV, a frequency of 100 kHz, and a pulse duration of 10 $\mu$s was measured.

(7) Static Friction Coefficients (Coilability)

Figure 3:
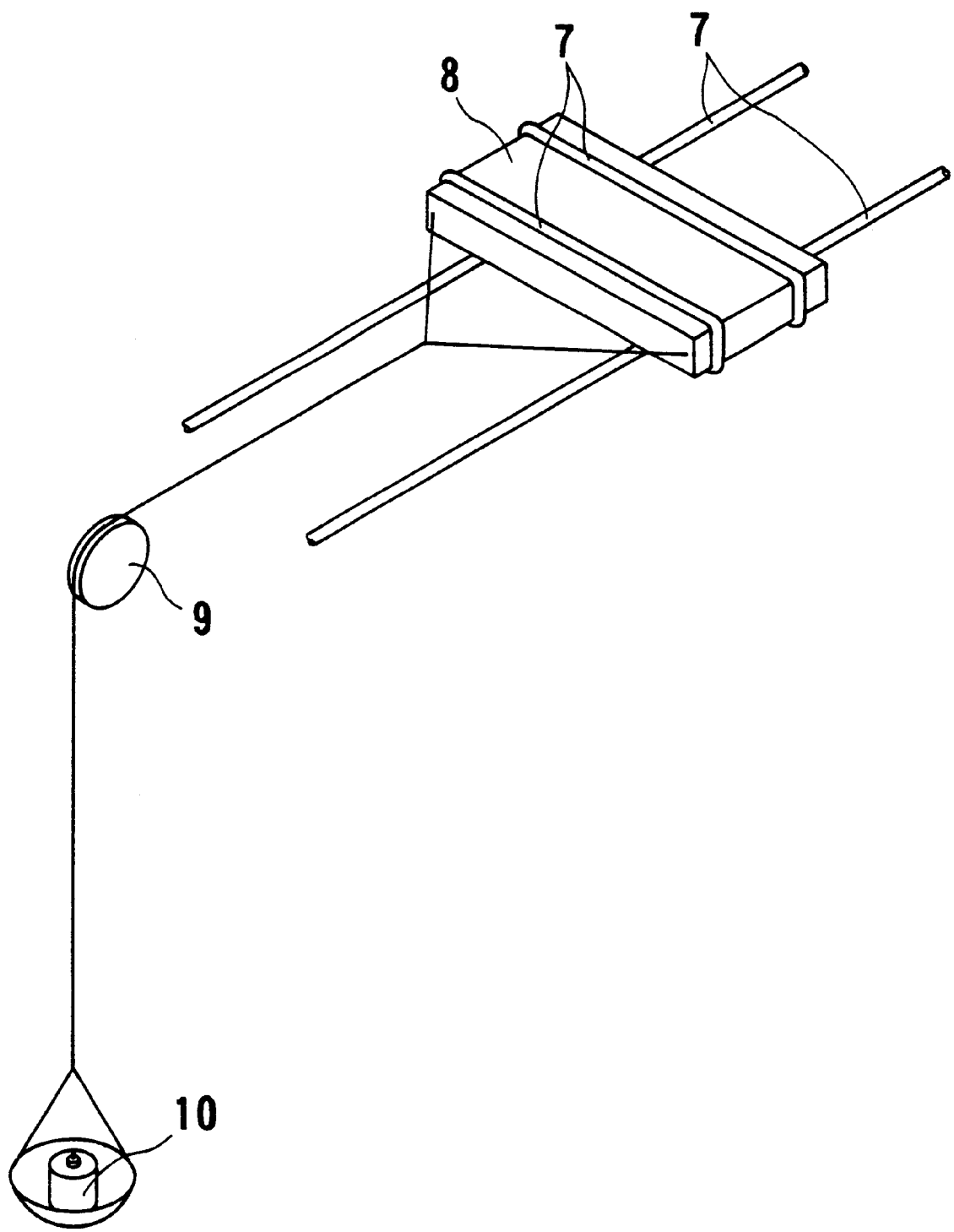
FIG. 3 is a schematic diagram showing a method of measuring static friction coefficients.

The measuring was done with an apparatus shown in FIG. 3. In FIG. 3, 7 indicates multilayer insulated wires, 8 indicates a load plate, 9 indicates a pulley, and 10 indicates a load. Letting the mass of the load 10 be F (g) when the load plate 8 whose mass is W (g) starts to move, the static friction coefficient is found from F/W.

The smaller the obtained numerical value is, the better the slipperiness of the surface is and the better the coilability is.

(8) Water Absorption

The water absorption was measured by a Karl Fischer's type water content measuring apparatus. The heating temperature was 200° C. Parenthetically, the materials used in Examples 1 to 10, Comparative Examples 1 and 2, and Reference Examples 1 and 2 were dried to have a water absorption of 0.05% or less.

The results are shown in Tables 1, 2, and 3.

TABLE 1

| | | | Example 1 | Example 2 | Example 3 | Example 4 | Example 5 |
|---|---|---|---|---|---|---|---|
| First layer | Resin (A) (wt. parts) | PEI*[1] | | | 100 | | |
| | | PES*[2] | 100 (0.48) | 100 (0.41) | | 100 (0.41) | 100 (0.41) |
| | Resin (B) (wt. parts) | PAR*[3] | | | | 80 | |
| | | PC*[4] | 65 | 18 | | | |
| | | PCT*[5] | | | | | 45 |
| | | PA*[6] | | | 45 | | |
| | Sum of resins (wt. parts) | | 165 | 118 | 145 | 180 | 145 |
| | Inorganic filler (C) (wt. parts) | titanium oxide 1*[7] | 150 | | | | |
| | | titanium oxide 2*[8] | | | | | |
| | | silica 1*[9] | | | | | |
| | | silica 2*[10] | | | | | |
| | Coating thickness ($\mu$m) of first layer | | 33 | 33 | 33 | 33 | 33 |
| Second layer | Resin (A) (wt. parts) | PEI*[1] | | | 100 | | |
| | | PES*[2] | 100 (0.48) | 100 (0.41) | | 100 (0.41) | 100 (0.41) |
| | Resin (B) (wt. parts) | PAR*[3] | | | | 80 | |
| | | PC*[4] | 65 | 18 | | | |
| | | PCT*[5] | | | | | 45 |
| | | PA*[6] | | | 45 | | |
| | Sum of resins (wt. parts) | | 165 | 118 | 145 | 180 | 145 |
| | Inorganic filler (C) (wt. parts) | titanium oxide 1*[7] | 150 | 50 | 16 | | |
| | | titanium oxide 2*[8] | | | | | |
| | | silica 1*[9] | | | | | |
| | | silica 2*[10] | | | | | |
| | Coating thickness ($\mu$m) of second layer | | 33 | 33 | 33 | 33 | 33 |
| Third layer (outer-most layer) | Resin (A) (wt. parts) | PEI*[1] | | | 100 | | |
| | | PES*[2] | 100 (0.48) | 100 (0.41) | | 100 (0.41) | 100 (0.41) |
| | Resin (B) (wt. parts) | PAR*[3] | | | | 80 | |
| | | PC*[4] | 65 | 18 | | | |
| | | PCT*[5] | | | | | 45 |
| | | PA*[6] | | | 45 | | |
| | Sum of resins (wt. parts) | | 165 | 118 | 145 | 180 | 145 |
| | inorganic filler (C) (wt. parts) | titanium oxide 1*[7] | 150 | 50 | 16 | 80 | |
| | | titanium oxide 2*[8] | | | | | 60 |
| | | silica 1*[9] | | | | | |
| | | silica 2*[10] | | | | | |
| | | calcium carbonate*[11] | | | | | |
| | | silica 3*[12] | | | | | |
| | Coating thickness ($\mu$m) of third layer | | 33 | 33 | 33 | 33 | 33 |
| Surface-treatment | | | refrigerating machine oil | refrigerating machine oil | refrigerating machine oil | refrigerating machine oil | solid paraffin |
| Overall coating thickness ($\mu$m) | | | 100 | 100 | 100 | 100 | 100 |
| Solvent resistance | | | 5H | 4H | 3H | 4H | 4H |
| Solderability (450° C.) | | | 3.5 | 4.5 | 4.5 | 3 | 3.5 |
| Dielectric breakdown voltage (kV) | | | 15.5 | 20.1 | 20.4 | 17.5 | 19.6 |
| Heat resistance | Class B | | passed | passed | passed | passed | passed |

TABLE 1-continued

|  | Example 1 | Example 2 | Example 3 | Example 4 | Example 5 |
|---|---|---|---|---|---|
| Class E | — | — | — | — | — |
| Heat shock resistance (1D) | good | good | good | good | good |
| High-frequency characteristic (3.8 kV) | 67.4 | 39.7 | 24.5 | 23.1 | 21.4 |
| Static friction coefficient | 0.18 | 0.15 | 0.15 | 0.16 | 0.1 |

(Note)*[1]polyetherimide resin, ULTEM 1000 (trade name; manufactured by GE Plastics Ltd.)
*[2]polyethersulfone resin, SUMIKAEXCEL PES (trade name; manufactured by Sumitomo Chemical Co., Ltd.); reduced viscosity is shown in parenthesis.
*[3]polyarylate resin, U-POLYMER U-1000 (trade name; manufactured by Unitika Ltd.)
*[4]polycarbonate resin, LEXAN SP-1210 (trade name; manufactured by GE Plastics Ltd.)
*[5]polyester (polycyclohexanedimethylene terephthalate) resin, EKTAR DA (trade name; manufactured by Toray Industries, Inc.)
*[6]polyamide resin (nylon 6-T, ARLEN AE-4200 (trade name; manufactured by Mitsui Petrochemical Industries, Ltd.)
*[7]FR-88 (trade name: manufactured by FURUKAWA CO., LTD.); av. particle diameter of 0.1 μm
*[8]RLX-A (trade name; manufactured by FURUKAWA CO., LTD.); av. particle diameter of 3 to 4 μm
*[9]UF-007 (trade name; manufactured by Tatsumori LTD.); av. particle diameter of 5 μm
*[10]5X (trade name; manufactured by Tatsumori LTD.); av. particle diameter of 1.5 μm
*[11]VIGOT-15 (trade name; manufactured by SHIRAISHI KOGYO KAISHA LTD.); av. particle diameter of 0.15 μm
*[12]A-1 (trade name: manufactured by Tatsuimori LTD.); av. particle diameter of 10 μm

TABLE 2

|  |  |  | Example 6 | Example 7 | Example 8 | Example 9 | Example 10 |
|---|---|---|---|---|---|---|---|
| First layer | Resin (A) (wt. parts) | PEI*[1] |  |  |  |  |  |
|  |  | PES*[2] | 100 (0.31) | 100 (0.31) | (0.31) | 100 (0.31) | 100 (0.31) |
|  | Resin (B) (wt. parts) | PAR*[3] |  |  |  |  |  |
|  |  | PC*[4] | 45 | 45 | 45 | 45 | 45 |
|  |  | PCT*[5] |  |  |  |  |  |
|  |  | PA*[6] |  |  |  |  |  |
|  | Sum of resins (wt. parts) |  | 145 | 145 | 145 | 145 | 145 |
|  | Inorganic filler (C) (wt. parts) | titanium oxide 1*[7] |  |  |  |  |  |
|  |  | titanium oxide 2*[8] |  |  |  |  |  |
|  |  | silica 1*[9] |  |  |  |  |  |
|  |  | silica 2*[10] |  |  |  |  |  |
|  | Coating thickness (μm) of first layer |  | 33 | 33 | 33 | 33 | 33 |
| Second layer | Resin (A) (wt. parts) | PEI*[1] |  |  |  |  |  |
|  |  | PES*[2] | 100 (0.31) | 100 (0.31) | 100 (0.31) | 100 (0.31) | 100 (0.31) |
|  | Resin (B) (wt. parts) | PAR*[3] |  |  |  |  |  |
|  |  | PC*[4] | 45 | 45 | 45 | 45 | 45 |
|  |  | PCT*[5] |  |  |  |  |  |
|  |  | PA*[6] |  |  |  |  |  |
|  | Sum of resins (wt. parts) |  | 145 | 145 | 145 | 145 | 145 |
|  | Inorganic filler (C) (wt. parts) | titanium oxide 1*[7] |  |  |  |  |  |
|  |  | titanium oxide 2*[8] |  |  |  |  |  |
|  |  | silica 1*[9] |  |  |  |  |  |
|  |  | silica 2*[10] |  |  |  |  |  |
|  | Coating thickness (μm) of second layer |  | 33 | 33 | 33 | 33 | 33 |
| Third layer (outermost layer) | Resin (A) (wt. parts) | PEI*[1] |  |  |  |  |  |
|  |  | PES*[2] | 100 (0.41) | 100 (0.41) | 100 (0.41) | 100 (0.41) | 100 (0.41) |
|  | Resin (B) (wt. parts) | PAR*[3] |  |  |  |  | 45 |
|  |  | PC*[4] | 45 | 45 | 45 | 45 |  |
|  |  | PCT*[5] |  |  |  |  |  |
|  |  | PA*[6] |  |  |  |  |  |
|  | Sum of resins (wt. parts) |  | 145 | 145 | 145 | 145 | 145 |
|  | inorganic filler (C) (wt. parts) | titanium oxide 1*[7] |  |  |  |  |  |
|  |  | titanium oxide 2*[8] |  |  |  | 60 | 40 |
|  |  | silica 1*[9] | 60 |  |  |  |  |
|  |  | silica 2*[10] |  | 60 |  |  |  |
|  |  | calcium carbonate*[11] |  |  | 60 |  |  |
|  |  | silica 3*[12] |  |  |  |  |  |
|  | Coating thickness (μm) of third layer |  | 33 | 33 | 33 | 33 | 33 |
| Surface-treatment |  |  | solid paraffin | fatty acid wax | fatty acid wax | fatty acid wax | fatty acid wax |
| Overall coating thickness (μm) |  |  | 100 | 100 | 100 | 100 | 100 |
| Solvent resistance |  |  | 4H | 4H | 4H | 4H | 4H |
| Solderability (450° C.) |  |  | 3.5 | 4 | 4 | 4 | 4 |
| Dielectric breakdown voltage (kV) |  |  | 20.1 | 20 | 19.8 | 25.1 | 26.0 |

TABLE 2-continued

|  |  | Example 6 | Example 7 | Example 8 | Example 9 | Example 10 |
|---|---|---|---|---|---|---|
| Heat resistance | Class B | passed | passed | passed | passed | passed |
|  | Class E | — | — | — | — | — |
| Heat shock resistance (1D) |  | good | good | good | good | good |
| High-frequency characteristic (3.8 kV) |  | 21.1 | 20.3 | 14.8 | 26.4 | 19.5 |
| Static friction coefficient |  | 0.1 | 0.0 | 0.1 | 0.09 | 0.09 |

(Note)*[1]polyetherimide resin, ULTEM 1000 (trade name; manufactured by GE Plastics Ltd.)
*[2]polyethersulfone resin, SUMIKAEXCEL PES (trade name; manufactured by Sumitomo Chemical Co., Ltd.); reduced viscosity is shown in parenthesis.
*[3]polyarylate resin, U-POLYMER U-1000 (trade name; manufactured by Unitika Ltd.)
*[4]polycarbonate resin, LEXAN SP-1210 (trade name; manufactured by GE Plastics Ltd.)
*[5]polyester (polycyclohexanedimethylene terephthalate) resin, EKTAR DA (trade name; manufactured by Toray Industries, Inc.)
*[6]polyamide resin (nylon 6-T, ARLEN AE-4200 (trade name; manufactured by Mitsui Petrochemical Industries, Ltd.)
*[7]FR-88 (trade name: manufactured by FURUKAWA CO., LTD.); av. particle diameter of 0.1 μm
*[8]RLX-A (trade name; manufactured by FURUKAWA CO., LTD.); av. particle diameter of 3 to 4 μm
*[9]UF-007 (trade name; manufactured by Tatsumori LTD.); av. particle diameter of 5 μm
*[10]5X (trade name; manufactured by Tatsumori LTD.); av. particle diameter of 1.5 μm
*[11]VIGOT-15 (trade name; manufactured by SHIRAISHI KOGYO KAISHA LTD.); av. particle diameter of 0.15 μm
*[12]A-1 (trade name: manufactured by Tatsuimori LTD.); av. particle diameter of 10 μm

TABLE 3

|  |  |  | Comparative example 1 | Comparative example 2 | Reference example 1 | Reference example 2 |
|---|---|---|---|---|---|---|
| First layer | Resin (A) (wt. parts) | PEI*[1] |  |  |  |  |
|  |  | PES*[2] | 100 (0.31) | 100 (0.31) | 100 (0.41) | 100 (0.41) |
|  | Resin (B) (wt. parts) | PAR*[3] |  |  |  |  |
|  |  | PC*[4] | 45 | 45 | 150 | 45 |
|  |  | PCT*[5] |  |  |  |  |
|  |  | PA*[6] |  |  |  |  |
|  | Sum of resins (wt. parts) |  | 145 | 145 | 145 | 145 |
|  | Inorganic filler (C) (wt. parts) | titanium oxide 1*[7] |  |  |  |  |
|  |  | titanium oxide 2*[8] |  |  |  |  |
|  |  | silica 1*[9] |  |  |  |  |
|  |  | silica 2*[10] |  |  |  |  |
|  | Coating thickness (μm) of first layer |  | 33 | 33 | 33 | 33 |
| Second layer | Resin (A) (wt. parts) | PEI*[1] |  |  |  |  |
|  |  | PES*[2] | 100 (0.31) | 100 (0.31) | 100 (0.41) | 100 (0.41) |
|  | Resin (B) (wt. parts) | PAR*[3] |  |  |  |  |
|  |  | PC*[4] | 45 | 45 | 150 | 45 |
|  |  | PCT*[5] |  |  |  |  |
|  |  | PA*[6] |  |  |  |  |
|  | Sum of resins (wt. parts) |  | 145 | 145 | 250 | 145 |
|  | Inorganic filler (C) (wt. parts) | titanium oxide 1*[7] |  |  |  |  |
|  |  | titanium oxide 2*[8] |  |  |  |  |
|  |  | silica 1*[9] |  |  |  |  |
|  |  | silica 2*[10] |  |  |  |  |
|  | Coating thickness (μm) of second layer |  | 33 | 33 | 33 | 33 |
| Third layer (outer-most layer) | Resin (A) (wt. parts) | PEI*[1] |  |  |  |  |
|  |  | PES*[2] | 100 (0.31) | 100 (0.48) | 100 (0.41) | 100 (0.41) |
|  | Resin (B) (wt. parts) | PAR*[3] |  |  |  |  |
|  |  | PC*[4] | 45 | 45 | 150 | 45 |
|  |  | PCT*[5] |  |  |  |  |
|  |  | PA*[6] |  |  |  |  |
|  | Sum of resins (wt. parts) |  | 145 | 145 | 250 | 145 |
|  | inorganic filler (C) (wt. parts) | titanium oxide 1*[7] |  |  |  |  |
|  |  | titanium oxide 2*[8] |  | 220 | 60 |  |
|  |  | silica 1*[9] |  |  |  |  |
|  |  | silica 2*[10] |  |  |  |  |
|  |  | calcium carbonate*[11] |  |  |  |  |
|  |  | silica 3*[12] |  |  |  | 60 |
|  | Coating thickness (μm) of third layer |  | 33 | 33 | 33 | 33 |
| Surface-treatment |  |  | refrigerating machine oil | refrigerating machine oil | refrigerating machine oil | refrigerating machine oil |
| Overall coating thickness (μm) |  |  | 100 | 100 | 100 | 100 |

TABLE 3-continued

|  | Comparative example 1 | Comparative example 2 | Reference example 1 | Reference example 2 |
| --- | --- | --- | --- | --- |
| Solvent resistance | swelled a little | 5H | 4H | 3H |
| Solderability (450° C.) | 4 | 4 | 3.5 | 4 |
| Dielectric breakdown voltage (kV) | 21 | 13.6 | 14.9 | 10.3 |
| Heat resistance    Class B | passed | not passed | not passed | not passed |
| Class E | — | passed | passed | passed |
| Heat shock resistance (1D) | poor | poor | poor | poor |
| High-frequency characteristic (3.8 kV) | 10.8 | 12.4 | 9.6 | 9.7 |
| Static friction coefficient | 0.16 | 0.15 | 0.17 | 0.25 |

(Note)*[1]polyetherimide resin, ULTEM 1000 (trade name; manufactured by GE Plastics Ltd.)
*[2]polyethersulfone resin, SUMIKAEXCEL PES (trade name; manufactured by Sumitomo Chemical Co., Ltd.); reduced viscosity is shown in parenthesis.
*[3]polyarylate resin, U-POLYMER U-1000 (trade name; manufactured by Unitika Ltd.)
*[4]polycarbonate resin, LEXAN SP-1210 (trade name; manufactured by GE Plastics Ltd.)
*[5]polyester (polycyclohexanedimethylene terephthalate) resin, EKTAR DA (trade name; manufactured by Toray Industries, Inc.)
*[6]polyamide resin (nylon 6-T, ARLEN AE-4200 (trade name; manufactured by Mitsui Petrochemical Industries, Ltd.)
*[7]FR-88 (trade name: manufactured by FURUKAWA CO., LTD.); av. particle diameter of 0.1 μm
*[8]RLX-A (trade name; manufactured by FURUKAWA CO., LTD.); av. particle diameter of 3 to 4 μm
*[9]UF-007 (trade name; manufactured by Tatsumori LTD.); av. particle diameter of 5 μm
*[10]5X (trade name; manufactured by Tatsumori LTD.); av. particle diameter of 1.5 μm
*[11]VIGOT-15 (trade name; manufactured by SHIRAISHI KOGYO KAISHA LTD.); av. particle diameter of 0.15 μm
*[12]A-1 (trade name; manufactured by Tatsuimori LTD.); av. particle diameter of 10 μm All of the insulated wires of Examples 1 to 10 passed the test of the heat resistance B class, they had a hardness of 3H or more without swelling of the coating in the test of the solvent resistance, and they were good in solderability and heat shock resistance and excellent in high-frequency characteristic.

In Example 1, since all the three layers were made of the mixture containing the inorganic filler (C) as specified in the present invention, the properties including the heat resistance, particularly the high-frequency characteristic, were good, although a little drop in the dielectric breakdown voltage was noticed.

In Examples 2 and 3, the mixture containing the inorganic filler (C) was used in two layers including the outermost layer, and the properties were good and well balanced. In comparison with Example 1, in Example 2, the proportion of the resin (B) added was low and a little drop in solderability was noticed. In Example 3, as the resin (A), a polyetherimide resin was used, and the solderability was a little poor in comparison with that of Example 1 wherein a polyethersulfone resin was used.

In Example 4, the mixture containing the inorganic filler (C) was used only for the outermost layer, and the properties were good and well balanced. The ratio of the resin (B) in each layer was high, and the solderability was particularly excellent.

In Examples 5 to 7, and 10, the mixture containing the inorganic filler (C) was used only for the outermost layer, the properties were good and the high-frequency characteristic was also excellent. Since a paraffin or a wax was used as a surface-treating agent, the coefficient of static friction was low and the coilability was high.

Similarly to Examples 5 to 7, and 10, in Example 8, the properties were good, but since a filler high in water absorption property was used, it is noticed that the compatibility between the filler and the resin was lowered and the electrical properties were lowered a little.

In Example 9, since enameled twisted wire was used as a conductor, particularly the electrical properties (breakdown voltage) and the high-frequency characteristic were excellent.

On the other hand, in Comparative Example 1, since all the three layers were made of a resin mixture made only of a polyethersulfone resin and a polycarbonate resin, the evaluation of the heat resistance resulted to pass the B class level, but a little swelling of the coating was shown in the test of the solvent resistance and the coating was cracked by heat shock. In comparison with Examples 1 to 10, the high-frequency characteristic was conspicuously low.

In Comparative Example 2, since the amount of the inorganic filler (C) was 220 parts by weight, which was too large, a drop in the flexibility in the ordinary state was large, as a result thereof the heat resistance, the breakdown voltage, and the heat shock resistance were poor and the high-frequency characteristic was low.

In Reference Example 1, since the proportion of the resin (B) in each layer was too high, the heat resistance was low and it could not pass even in the test of the E class.

In Reference Example 2, since the average particle diameter of the inorganic filler was too large, the external appearance of the resultant insulated wire was bad and the properties were low in general.

INDUSTRIAL APPLICABILITY

The multilayer insulated wire of the present invention is preferably suitable for use in high-frequency equipments, such as computers, parts of domestic electric equipments, and communication equipments, since it is heat-resistant high enough to satisfy the heat resistance B class, it has high solvent-resistant, cracks due to heat shock are not formed, and, further, electric properties at high frequencies are good. Further, the insulated wire of the present invention is preferably suitable for a lead wire or a winding in a transformer, and when the terminal is worked, direct soldering can be carried out, since the insulated wire is excellent in solderability and coilability.

Further, the transformer of the present invention wherein the multilayer insulated wire is utilized, is preferably suitable for electrical/electronic equipments that are increasingly made small-sized, because the transformer is excellent in electrical properties without being lowered in electric properties when a high frequency is used in a circuit, and the transformer is less influenced by generation of heat.

Having described our invention as related to the present embodiments, it is our intention that the invention not be limited by any of the details of the description, unless otherwise specified, but rather be construed broadly within its spirit and scope as set out in the accompanying claims.

What is claimed is:

1. A multilayer insulated wire comprising conductor and solderable extrusion-insulating layers made up of two or more layers for covering the conductor, wherein at least one insulating layer is formed by a mixture comprising 100 parts by weight of a resin (A), 10 parts by weight or more of a resin (B), and 15 to 200 parts by weight of at least one inorganic filler (C) selected from the group consisting of titanium oxide, silica, alumina, zirconium oxide, barium sulfate, clay and talc;

wherein the resin (A) is a polyethersulfone resin and the resin (B) is at least one selected from the group consisting of polycarbonate resin and polyarylate resin.

2. The multilayer insulated wire as claimed in claim 1, wherein the mixture, which comprises the resins (A) and (B), and the inorganic filler (C), comprises 100 parts by weight of the resin (A), 10 to 70 parts by weight of the resin (B), and 20 to 140 parts by weight of the inorganic filler (C).

3. The multilayer insulated wire as claimed in claim 1 or 2, wherein insulating layers other than the insulating layer made of the mixture that comprises the resins (A) and (B) and the inorganic filler (C), are made of a resin mixture that comprises 100 parts by weight of the resin (A) and 10 parts by weight or more of the resin (B).

4. The multilayer insulated wire as claimed in claim 1 or 2, wherein insulating layers other than the insulating layer made of the mixture that comprises the resins (A) and (B) and the inorganic filler (C), are made of a resin mixture that comprises 100 parts by weight of the resin (A) and 20 to 70 parts by weight of the resin (B).

5. The multilayer insulated wire as claimed in claim 1, wherein the insulating layer made of the mixture that comprises the resins (A) and (B) and the inorganic filler (C) is formed at least as the outermost layer.

6. The multilayer insulated wire as claimed in claim 1, wherein the resin (B) is a polycarbonate resin and a polyarylate resin.

7. The multilayer insulated wire as claimed in claim 1, wherein the resin (A) is a polyethersulfone resin having a repeating unit represented by the following formula:

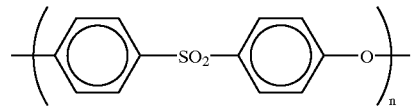

wherein n is a positive integer.

8. The multilayer insulated wire as claimed in claim 1, wherein the inorganic filler (C) is at least one selected from the group consisting of titanium oxide and silica.

9. The multilayer insulated wire as claimed in claim 1, wherein the inorganic filler (C) has an average particle diameter of 5 $\mu$m or less.

10. A multilayer insulated wire, comprising the multilayer insulated wire in claim 1 whose surface is coated with a paraffin and/or a wax.

11. A transformer comprising the multilayer insulated wire of claim 1.

* * * * *